United States Patent
Burtsche et al.

(10) Patent No.: US 8,425,169 B2
(45) Date of Patent: Apr. 23, 2013

(54) SECURING ELEMENT FOR SCREW CONNECTIONS AND ITS USE

(75) Inventors: Daniel Burtsche, Kempten (DE); Jürgen Meyer, Kempten (DE); Sven Schreiner, München (DE); Hubert Friedrich, Friedrichshafen (DE)

(73) Assignee: ESK Ceramics GmbH & Co. KG, Kempten (DE)

( * ) Notice: Subject to any disclaimer, the term of this patent is extended or adjusted under 35 U.S.C. 154(b) by 79 days.

(21) Appl. No.: 12/292,340

(22) Filed: Nov. 17, 2008

(65) Prior Publication Data
US 2010/0119326 A1 May 13, 2010

(30) Foreign Application Priority Data
Nov. 7, 2008 (DE) .................. 10 2008 056 368

(51) Int. Cl.
*F16B 39/00* (2006.01)
(52) U.S. Cl.
USPC .......................................... 411/257; 411/197
(58) Field of Classification Search ............. 411/257, 411/533, 900, 914, 197, 204, 223, 240, 242, 411/319, 132, 160, 147; 428/141, 323, 443, 428/67, 545, 698, 472.2, 370; 451/53, 533
See application file for complete search history.

(56) References Cited

U.S. PATENT DOCUMENTS

| | | | | |
|---|---|---|---|---|
| RE15,379 E * | 6/1922 | Bechberger | ............ | 411/201 |
| 2,502,892 A * | 4/1950 | Saylor | ............ | 411/427 |
| 2,878,140 A * | 3/1959 | Barr | ............ | 427/295 |
| 3,615,309 A * | 10/1971 | Dawson | ............ | 51/309 |
| 3,894,570 A * | 7/1975 | Reynolds | ............ | 411/333 |
| 4,688,962 A * | 8/1987 | Koltookian | ............ | 403/408.1 |
| 5,096,352 A * | 3/1992 | Lemelson | ............ | 411/424 |
| 5,190,423 A * | 3/1993 | Ewing | ............ | 411/134 |
| 5,925,413 A * | 7/1999 | Holzer et al. | ............ | 427/249.12 |
| 6,319,108 B1 * | 11/2001 | Adefris et al. | ............ | 451/533 |
| 6,945,850 B2 * | 9/2005 | Perrey | ............ | 451/28 |
| 7,544,117 B2 * | 6/2009 | Sung | ............ | 451/443 |
| 2003/0087097 A1 | 5/2003 | Lukschandel et al. | | |

FOREIGN PATENT DOCUMENTS

| | | |
|---|---|---|
| CA | 2 273 048 A1 | 11/1999 |
| DE | 40 38 557 A1 | 6/1992 |
| DE | 4038557 A1 | 6/1992 |
| DE | 19823928 A1 | 12/1999 |

(Continued)

OTHER PUBLICATIONS

International Search Report issued in corresponding International Application No. PCT/EP2009/007725, with a mailing date of Feb. 18, 2010.

*Primary Examiner* — Gary Estremsky
(74) *Attorney, Agent, or Firm* — Nath, Goldberg & Meyer; Jerald L. Meyer; Sanjana Mangalagiri

(57) ABSTRACT

Described is a device and method for a securing element for screw connections as an interlayer, between the screw head and supporting material and/or between the nut and supporting material, the basic body of the element consisting of a metallic material, to the top side and underside of which hard material particles are fixed, wherein the hard material particles are fixed by means of a metallic binding phase, the thickness of the metallic binding phase being lower than the mean diameter of the hard material particles, so that the hard material particles project out of the metallic binding phase.

14 Claims, 1 Drawing Sheet

FOREIGN PATENT DOCUMENTS

| | | |
|---|---|---|
| DE | 10150166 A1 | 5/2003 |
| DE | 102006023398 A1 | 11/2007 |
| EP | 0 961 038 A1 | 12/1999 |
| EP | 0961038 A1 | 12/1999 |
| EP | 1 300 485 A1 | 4/2003 |
| EP | 1300485 A1 | 4/2003 |

* cited by examiner

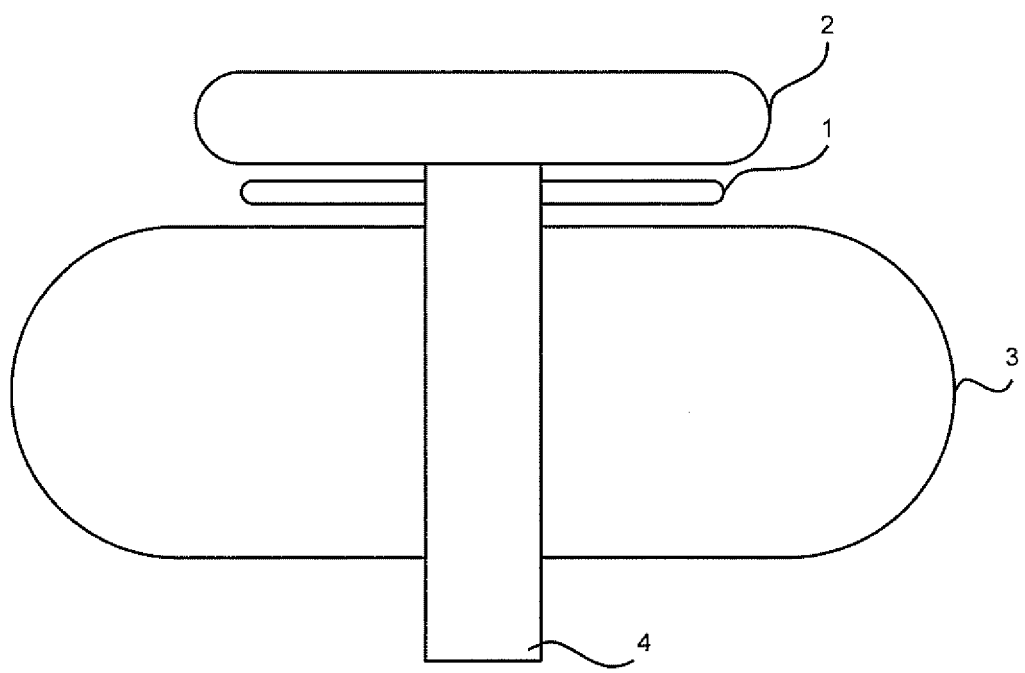

SECURING ELEMENT FOR SCREW CONNECTIONS AND ITS USE

FIELD OF THE INVENTION

The invention relates to a mechanical screw securing device in the form of a securing element for screw connections as an interlayer between the screw head and supporting material and/or between the nut and supporting material, and to the use of such a securing element for highly loaded, permanent and rereleasable screw connections.

BACKGROUND OF THE INVENTION

Screw connections are employed in all sectors of machine, plant and motor vehicle construction in order to achieve non-positive connections. Particularly in the case of a dynamic load on the screw connections, many of the conventional screw connections do not ensure sufficient safety against an automatic release of the screw connections. There are therefore efforts to provide measures for the securing of screw connections, in order, under high and, in particular, dynamic loads, to prevent an automatic release of the screw connections.

PRIOR ART

There are various mechanical screw securing devices which are available commercially. Examples of such screw securing devices are the ribbed screw, the serrated screw, the NordLock pair of washers, the Teckentrup washer and the Schnorr washer.

The ribbed screw (or else the ribbed nut) described, for example, in DE 25 56 985 A1 has a profiling on the underside of the screw head. As a result of the elastic ribs, the securing action occurs in the slightly plastic range of the supports (spinning effect). In this case, a separate securing washer is not used.

The NordLock screw securing device (loose-turn securing device) uses a pair of wedge-type securing washers. The washers have on the outside radial ribs and on the inside wedge surfaces, the pitch of which is always greater than the thread pitch. The washers glued together in pairs are laid under the screw head and/or the nut. The radial ribs cause a positive connection during tightening. The pair of washers then sits firmly in its place, and movements are possible only between the wedge surfaces. Even when there is the least possible turn in the releasing direction, an increase in the clamping force occurs due to the wedge action, and the screw thus secures itself. A mounting element for a pair of Nord-Lock wedge-type securing washers is described, for example, in WO 02/31368 A1.

The Schnorr washer is a resilient washer between the screw head and workpiece and is serrated on the top side and on the underside.

The Teckentrup washer secures non-positively and positively against the slackening and turning loose of screw connections. The non-positive connection of the Teckentrup washer is brought about by spring force. The Teckentrup washer achieves the positive connection by means of specific surface embossing.

Some of the screw securing devices have proved to be useless, such as, for example, the Teckentrup and the Schnorr washer (see the comparative examples). The Teckentrup and the Schnorr washers offer no securing action against turning loose under transverse load. The pair of NordLock washers has the disadvantage that dynamic load on the screw connections causes a loss of pretensioning force due to settling and/or relaxation, particularly in the case of high-strength screws of strength classes 10.9 and 12.9 (see the comparative examples).

The serrated screw, like the ribbed screw, is a head-blocking system for which no separate securing element is required. The serrated screw, although exhibiting a good securing action, nevertheless has a disadvantage that the toothings penetrate into the mating layers, that is to say the surfaces of the supporting materials, and that this results in relatively serious damage to the surfaces of the supporting materials. The ribs of the NordLock washers also penetrate into the mating layers.

Serious damage to the surface of the supporting materials also has a highly adverse effect on rescrewability. The surface roughness is greatly modified, thus increasing the under-head friction in an uncontrolled way and consequently changing the pretensioning force.

The ribbed screw, too, exhibits a good securing action (see, in this respect, comparative example 1).

When head-blocking securing screws (steel screws) are used in light metal or aluminum structures which experience operating temperatures of 110° C. and above, the steel screws are loaded beyond the yield strength. After retooling to room temperature, increased pretensioning force settling losses occur.

A further disadvantage of the head-blocking systems is that, in the case of multiple use, the head-blocking screws and nuts have to be reamed in the blocking regions.

Furthermore, there are also thread-blocking systems, such as, for example, Spira-Lock (locking threads with a special design of the threaded profile). There is a disadvantage, in these systems, that screws lubricated grip-dry have to be used, since the coefficient of friction in the unlubricated state are above $\mu$ ges=0.25, whereas VDI 2230 stipulates a coefficient of friction of $\mu$ ges=0.12 for calculation.

A further possibility for the securing of screws is adhesive bonding by means of a liquid plastic. A high degree of cleaning is necessary for this purpose, however, thus leading to an increased outlay.

DE 40 38 557 C2 describes a securing washer for screw connections which consists of a paper, plastic or metal film in a thickness of 0.1 to 0.3 mm with hard particles glued to the top side and underside. The hard particles are preferably oxide-ceramic round particles with a size of 50 to 150 µm.

A securing washer according to DE 40 38 557 C2 has not proved appropriate in practice. The round particles used here are conducive to the sliding of the parting surfaces with respect to one another, this being a disadvantage in terms of the securing action. The use of particles in a size of 50 to 150 µm leads to a gap which may adversely influence the planeness of the substrates and the planicity of the contact surfaces with one another. Moreover, on account of the low shear strength of the adhesive, there is the problem that, during the screwing operation and the relative movement occurring in this case between the particles and surfaces, the particles do not remain in their original position, thus resulting in an uncontrolled inhomogeneous covering of the surface with particles. in addition to the unsuitable spherical particle shape, this leads, overall, to a poor securing action.

OBJECT OF THE INVENTION

The object on which the invention is based, therefore, is to make available a screw securing device which, in terms of the securing action, is at least equivalent to or else superior to the known screw securing devices of the prior art, but which avoids the disadvantages of the prior art, in particular does not lead to a relatively deep penetration of the screw securing device into the surface of the supporting material and therefore not to relatively serious damage to the surface of the supporting material, and which can be used for highly loaded, permanent, rereleasable and rescrewable screw connections.

SUMMARY OF THE INVENTION

The above object is achieved, according to the invention, by means of a securing element for screw connections, as described herein. Advantageous and particularly expedient refinements of the subject of the application are specified herein.

The subject of the invention is therefore a securing element for screw connections as an interlayer between the screw head and supporting material and/or between the nut and supporting material, the basic body of the element consisting of a metallic material, to the top side and underside of which hard material particles are fixed, which securing element is defined in that the hard material particles are fixed by means of a metallic binding phase, the thickness of the metallic binding phase being lower than the mean diameter of the hard material particles, so that the hard material particles project out of the metallic binding phase.

The subject of the invention is also the use of a securing element according to the invention for highly loaded, permanent and rereleasable screw connections, the securing element being used as an interlayer between the screw head and supporting material and/or between the nut and supporting material.

An essential advantage of the securing element according to the invention is that, during screwing, there is a relatively low penetration into the surface of the supporting materials and there is therefore only relatively minor damage to the surface of the supporting materials.

For conventional securing systems with grooved surfaces in the screw head underside, such as the serrated screw, or in securing washers, as in the pair of NordLock washers, the depth of damage is in the range of about 100 to 200 μm, whereas, when the securing element according to the invention is used, for example with the use of hard material graining having a mean particle size of 10 μm, the depth of damage amounts to only approximately 4-6 μm corresponding to the free grain projecting length.

In the case of the opening and closing of a screw connection secured according to the invention, the mating surfaces are only slightly damaged, and therefore, before the renewed closing of the connection, the mating surfaces need not be or need be only slightly reamed and cleaned or mechanically remachined.

With the securing element according to the invention, therefore, rescrewing is possible, without complicated cleaning and machining measures being required, that is to say the screw bonds do not have to be reworked before rescrewing. Preferably, however, a new securing element is used for the rescrewing. The securing element according to the invention can be used in all materials, including all hardened materials, in contrast to some of the commercially available securing systems, such as the head-blocking systems and the pair of NordLock washers, which can be used only in unhardened materials. The securing element according to the invention can be used even in light metal structures, for example in aluminum structures.

If a thin coated film in a thickness of 0.1 mm is used as a securing element according to the invention, this affords the additional advantage of a considerable rate saving, as compared with standard securing elements, which, amounts to even approximately 94%, for example, in the case of a standard M6 screw connection with a standard securing washer of a thickness of 1.6 mm, and, furthermore, the advantage of a smaller construction space.

BRIEF DESCRIPTION OF THE FIGURE(S)

FIG. 1 is a cross-sectional illustration of an exemplary embodiment.

DETAILED DESCRIPTION OF THE INVENTION

The basic body of the securing element according to the invention consists of a metallic material, preferably steel and, further preferably, spring steel. A commercially available unalloyed spring band steel may be used. Such spring-elastic or flexion-elastic steels preferably possess a tensile strength in the range of 350-1850 N/mm$^2$, even more preferably of 800-1600 N/mm$^2$. However, other, in particular even softer steels may also be used. Acid-resistant and/or temperature-resistance steels are employed, depending on the application.

The thickness of the securing element is dependent both on the application and on the screw size and preferably amounts to $\leq 2$ mm, further preferably to $\leq 0.2$ mm and particularly preferably to 0.1-0.2 mm. Thin films with a thickness of 0.1 to 0.2 mm are employed preferably when a weight saving and restricted construction space or packing density are relevant. Thicker elements are employed, for example, in the case of larger screw connections and multiple screw connections or flanges, in which individual elements should not be used. The thickness of the elements may be selected as a function of the screw diameter according to DIN 125.

The elements may be produced by stamping, lasering or erosion.

The hard materials used are preferably materials which under the respective conditions of use do not react chemically either with the materials of the screw connections or with ambient media. Preferred examples of hard materials are carbides such as SiC, WC and $B_4C$, nitrides such as $Si_3N_4$ and cubic BN, borides or $SiO_2$ or $Al_2O_3$ or diamond. In particular, diamond, $B_4C$ or SiC are preferably used.

The size of the hard particles is to be selected such that damage to the supporting materials by the particles being pressed in does not reach an inadmissible extent. A particle size with a maximum diameter of 0.1 mm generally fulfils this requirement.

Particularly preferably, hard particles with a maximum diameter of 35 μm are used, and particularly preferred are grainings with a mean grain size $D_{50}$ in the range of to 35 μm, further preferably of 10 to 25 μm. The grain size is determined in a known way by means of laser diffraction, for example with an appliance from the company CILAS (CILAS 1064), on solid dispersions.

In instances where existing corrosion protection layers have to be penetrated, it may be expedient to use hard particles with a mean size of more than 30 μm. Typical corrosion protection measures are phosphatings and KTL lacquers. Phosphatings usually have layer thicknesses of up to 15 μm and KTL lacquers of up to 25 μm. For phosphatings, therefore, the use of hard particles with a mean diameter of 35 μm or more may be expedient, and of 55 μm or more in the case of KTL lacquers.

The number of hard particles per unit area of the contact surfaces of the supporting materials is preferably to be selected such that the tightening of the screws ensures that the particles are pressed into the mating surface. For this purpose, at least 5% of the contact surface of the securing element should be covered with hard particles, a covering greater than 30% not affording any further advantages.

The securing elements according to the invention in the form of perforated elements are coated with a metallic layer having embedded hard material particles. Coating preferably takes place by means of electroplating methods. Coating preferably takes place after the production of the perforated elements, but it is also possible to carry out strip coating and then separate the individual elements from the strip, for example by stamping or lasering.

The metallic layer serves as a binding phase for the hard material particles. Particularly preferably, the coatings may be produced by means of external-currentless (=chemical) nickel-plating. The applied chemical nickel layers may be cured by means of heat treatment up to approximately 400° C., with the result that adhesion to the element material is improved and the inherent strength of the layer is increased.

In a preferred embodiment, the strength of the metallic binding phase is at least as high as the strength of the supporting and screw material. It is also possible, however, that the strength of the binding phase is lower than the strength of the supporting and screw material.

The thickness of the metallic binding phase should be lower than the mean particle size of the hard particles, so that these project out of the coating and can engage into the surface of the supporting materials. Preferably, the thickness of the metallic binding phase amounts to a maximum of about 60% of the mean diameter of the hard material particles. The layer thickness is therefore to be selected as a function of the particle size of the hard particles. For example, in the case of a mean grain size of the hard particles of 10 μm, the layer thickness should amount to approximately 6 μm.

The coated securing elements are resistant to acids and lyes and are temperature-resistant. When diamond is used as hard material particles, applications with temperatures of up to about 500° C., and, in the case of carbides, even up to higher temperatures of approximately 800° C., are possible.

The securing element according to the invention may be designed as a single-hole or multiple-hole securing element. In the simplest and preferred embodiment, the securing element according to the invention is a securing washer, in particular a single-hole or multiple-hole washer. However, the securing element may also have any desired regular or irregular outer contours, for example in order to adapt to the contours of the supporting material of the screw connections. This applies both to single and to multiple securing elements.

The securing element according to the invention may be employed, in particular, for highly loaded permanent screw connections which must be rereleasable and rescrewable. It may be employed for screw connections which must be reusable without a complicated cleaning or reaming of the screw connection surfaces.

Usually, one securing element is used per screw connection and is laid under the screw head and/or the nut and screwed. It is also possible, however, in multiple screw connections in which a connection is made by means of a plurality of screw connections next to one another, to use, instead of individual securing elements for each individual screw connection, a single securing element for all the screws together. This securing element may be, for example, a circular washer in which a plurality of circular perforations are present for the individual screws, but further outer contours are also possible. Such a multiple securing washer affords advantages in terms of the mounting of such a connection, since, in that case, individual securing washers do not have to be laid in place and screwed individually.

FIG. 1 is a schematic illustration of an exemplary embodiment, wherein 1 represents a securing element as an interlayer, 2 represents a screw head, 3 represents a supporting material, and 4 represents a screw shaft. FIG. 1 illustrates an exemplary embodiment wherein the securing element 1 is a single hole embodiment. As detailed above, multiple holes may be utilized.

EXAMPLES AND COMPARATIVE EXAMPLES

The following examples and comparative examples serve for explaining the invention in more detail.

Example 1

Production of a Securing Element According to the Invention
Perforated washer $D_a$=20 mm, $D_i$=10.3 mm, h=2 mm To produce a securing element 1 according to the invention, first, annular washers in the dimensions d20/10.3*2.0 mm are stamped out of uncoated 2.0 mm thick sheet steel C 75 S+QT. This sheet has a strength of 1412-1449 $N/mm^2$.

The prefabricated washers are slipped onto suitable mountings and are pretreated by degreasing, pickling and activation according to the general rules of electroplating.

The product carrier having the washers is then dipped into a chemical nickel bath in which diamond powder with a mean particle diameter of 20 μm is dispersed. The quantity of dispersed diamond powder is selected such that, under the conditions prevailing in the coating bath (bath movement; deposition rate), the desired surface covering with diamond particles is achieved. In the present case, a surface covering of 19.5±1.5% was determined. The thickness of the deposited metal layer was set at 10 μm such that the free grain projecting length corresponds to about 50% of the grain diameter. In order to achieve highly uniform grain projecting length, it is advantageous, in a first coating step, to fix the diamond particles on the washer surface, the layer thickness amounting to <3 μm. In a second coating step, the final layer thickness is set in a solid-free nickel bath. Under conventional method conditions, the overall immersion time in the coating baths amounts to about 30 minutes.

The product carrier with the then coated washers is removed from the coating bath and cleaned in an ulatrasonic bath in order to remove only loosely adhering diamond particles.

The cleaned washers are detached from the product carrier and subjected to heat treatment of 2 hours at 350° C. This treatment improves the adhesion of the chemical nickel layer on the steel film and the seating of the particles in the layer itself. Heat treatment at reduced temperatures may also be advantageous, depending on the substrate.

Example 2 and Comparative Examples 1 to 4

To investigate the securing action, a vibration test according to DIN 65151 with a 12.5 Hz dynamically changing transverse force load was conducted on a vibrating test bench of the Junker type. The pretensioning force profile was measured and recorded as a function of the load changes (time). In each case 1000 load changes were carried out. Black M10 screws according to DIN EN ISO 4017 of strength class 10.9 according to ISO 898-1 were used for the tests. The clamping length amounted to 1.5 mm. The screws were tightened continuously and uniformly by means of a torque wrench. The pretensioning force amounted to 40 kN.

The assessment of the securing action is carried out on the basis of the pretensioning force drop over the test time. If the pretensioning force still amounts to 80% of the original pretensioning force and above at the end of the test, then the securing action is given turning-loose securing. If the pretensioning force lies below 80%, but still amounts to at least 20%, at the end of the test, a captive securing action is given. If the pretensioning force lies below 20% at the end of the test, the securing element is unusable.

The supporting material used for the tests: a structural steel of medium hardness (hardness 163 HV5, material designation S355J2G3 or St 52-3), a cast material (EN-GJL-250), a case hardening steel (hardness 210 HV5, material designation 16MnCr5) and an aluminum material (AlMgSi1). The surface roughness of the supporting materials amounted to $R_a$=1 μm, and tests with $R_a$=2.5 μm were additionally conducted for the supporting materials S355J2G3 and EN-GJL-250.

The securing elements used for the tests were a securing washer according to the invention, as in example 1, and further commercially available screw securing devices (securing washers by NordLock, Teckentrup and Schnorr and the ribbed screw with the profiling on the underside of the screw head).

The result of the tests after 1000 load changes is illustrated in tables 1 and 2.

Table 1 illustrates for the tests conducted how high the pretensioning force after 1000 load changes was in relation to the pretensioning force at the start of the tests. This value should be at least 80%, so that a good turning-loose securing action is given. In the tests with the Schnorr washer and the Teckentrup washer, the pretensioning force had fallen to zero even after fewer than 1000 load changes, in these cases the table indicates, in each case in square brackets, after how many load changes the pretensioning force had fallen to zero.

Table 2 illustrates the assessment of the tests conducted in terms of the securing action.

It may be gathered from Table 2 that the securing element according to the invention and the commercially available ribbed screw fulfill the preconditions for the securing action of a turning-loose securing very well. By contrast, the "NordLock" securing device is already somewhat poorer, since, in the supporting materials tested, the pretensioning force falls more markedly during the test. The Schnorr washer and the Teckentrup washer both proved to be unusable. The drop in pretensioning force is partly lower in the tests with the securing washer according to the invention, as in example 1, than in the tests with the ribbed screw.

After the tests, the depth of damage of the aluminum supporting material was measured by means of confocal laser scanning microscopy. The mean depth of punctiform damage amounts to 10 μm for the tests conducted with example 1, and, in comparative example 1 (ribbed screw) it is 140 μm over a large area.

TABLE 1

Pretensioning force after 1000 load changes in relation to the pretensioning force at the start of the tests

|  | S355J2G3 (St 52-3) | | EN-GJL-250 | | 16MnCr5 | AlMgSi1 |
|---|---|---|---|---|---|---|
|  | $R_a$ = 1 | $R_a$ = 2.5 | $R_a$ = 1 | $R_a$ = 2.5 | $R_a$ = 1 | $R_a$ = 1 |
| Example 1 | 88% | 86% | 93% | 91% | 87% | 90% |
| Comparative example 1 (ribbed screw) | 87% | 88% | 87% | 87% | 87% | 88% |
| Comparative example 2 (Nord-Lock) | 77% | 78% | 81% | 81% | 79% | 76% |
| Comparative example 3 (Schnorr washer) | 0% [250] | 0% [300] | 0% [300] | 0% [300] | 0% [300] | 0% [220] |
| Comparative example 4 (Teckentrup) | 0% [600] | 0% [380] | 0% [400] | 0% [350] | 0% [400] | 0% [400] |

TABLE 2

Securing action of the various screw securing devices for various supporting materials

|  | S355J2G3 (St 52-3) | EN-GJL-250 | 16MnCr5 | AlMgSi1 |
|---|---|---|---|---|
| Example 1 | very good, turning-loose securing | very good, turning-loose securing | very good, turning-loose securing | very good turning-loose securing |
| Comparative example 1 (ribbed screw) | very good, turning-loose securing | very good, turning-loose securing | Very good, turning-loose securing | Very good, turning-loose securing |
| Comparative example 2 (Nord-Lock) | Satisfactory (captive securing at the limit with turning-loose securing) | Good (turning-loose securing, but pretensioning force lower than above) | Satisfactory (captive securing at the limit with turning-loose securing) | Satisfactory (captive securing at the limit with turning-loose securing) |
| Comparative example 3 (Schnorr washer) | unusable | unusable | unusable | unusable |
| Comparative example 4 (Teckentrup) | unusable | unusable | unusable | unusable |

The invention claimed is:
1. A securing element for screw connections as an interlayer between a screw head and supporting material and/or between a nut and supporting material, a basic body of the securing element consisting of a metallic material, to a top side and underside of which hard material particles are fixed, wherein the hard material particles are fixed by means of a single metallic binding phase, a maximum thickness of the single metallic binding phase being a maximum of 60% of a mean diameter of the hard material particles, so that the hard material particles project out of the single metallic binding phase, and wherein the hard material particles have a maximum diameter of approximately 100 μm and a mean grain size $D_{50}$ in the range of approximately 20 to 35 μm.

2. The securing element of claim 1, wherein the metallic material of the securing element is spring steel with a tensile strength of approximately 350-1850 N/mm².

3. The securing element of claim 1, wherein the securing element has a thickness of ≦2 mm.

4. The securing element of claim 1, wherein the hard material particles are selected from the group consisting of carbides, nitrides, borides, diamond, $SiO_2$ and $Al_2O_3$.

5. The securing element of claim 1, wherein 5 to 30% of a contact surface of the securing element is covered with the hard material particles.

6. The securing element of claim 1, wherein the metallic binding phase is a chemical nickel layer generated by electroplating.

7. The securing element of claim 1, wherein it is a single-hole securing element.

8. The securing element of claim 1, wherein it is a multiple-hole securing element.

9. The use of a securing element of claim 1 for highly loaded, permanent or rereleasable screw connections, the securing element being used as an interlayer between the screw head and supporting material and/or between the nut and supporting material.

10. The securing element of claim 3, wherein the securing element has a thickness of approximately 0.1-0.2 mm.

11. The securing element of claim 4, wherein the hard material particles are selected from at least one of diamond, silicon carbide and boron carbide.

12. The securing element of claim 1, wherein the hard material particles have a maximum diameter of approximately 35 μm.

13. The securing element of claim 7, wherein the single-hole securing element is a single-hole washer.

14. The securing element of claim 8, wherein the multiple-hole securing element is a multiple-hole washer.

* * * * *

UNITED STATES PATENT AND TRADEMARK OFFICE
CERTIFICATE OF CORRECTION

PATENT NO. : 8,425,169 B2
APPLICATION NO. : 12/292340
DATED : April 23, 2013
INVENTOR(S) : Daniel Burtsche et al.

It is certified that error appears in the above-identified patent and that said Letters Patent is hereby corrected as shown below:

In the Claims:

Claim 3, column 9, Line 10, after "thickness of" and before "2mm"

Please delete "$\leqq$" and replace with --$\leq$--

Signed and Sealed this
Tenth Day of September, 2013

Teresa Stanek Rea
*Acting Director of the United States Patent and Trademark Office*